United States Patent [19]

Weir

[11] 4,185,679
[45] Jan. 29, 1980

[54] SUN SHADE SCREEN

[76] Inventor: Jimmie E. Weir, 1210 Grand Ave., Phoenix, Ariz. 85007

[21] Appl. No.: 964,260

[22] Filed: Nov. 27, 1978

Related U.S. Application Data

[63] Continuation-in-part of Ser. No. 819,338, Jul. 27, 1977.

[51] Int. Cl.² .......................... E06B 3/12; E06B 9/00
[52] U.S. Cl. ................... 160/231 A; 160/234
[58] Field of Search .................. 160/130, 131, 229 R, 160/230, 231 R, 231 A, 233, 234; 16/150

[56] References Cited

U.S. PATENT DOCUMENTS

| 729,498 | 5/1903 | Lange | 160/234 |
| 1,493,660 | 5/1924 | Whalen | 160/230 |
| 1,658,386 | 2/1928 | Mayers | 16/150 |
| 1,667,658 | 4/1928 | Egley | 160/233 |
| 2,168,022 | 8/1939 | Drager | 160/231 R |
| 2,253,606 | 8/1941 | Biltz | 16/150 |

FOREIGN PATENT DOCUMENTS 1063697  3/1967  United Kingdom ...................... 16/150

Primary Examiner—Peter M. Caun
Attorney, Agent, or Firm—Cahill, Sutton & Thomas

[57] ABSTRACT

A sun shade screen having a hollow frame and flexible screen material surrounded by and attached to the frame. The frame is formed in two equal frame members with the open hollow frame sections of each member opposing the hollow frame sections of the other member. The opposing hollow frame sections are maintained in registration by flexible inserts extending into the hollow frame sections to permit the frame members to be hinged relative to one another and to permit the frame and said flexible material to be folded upon itself.

7 Claims, 5 Drawing Figures

SUN SHADE SCREEN

The present invention pertains to sun shade screens and more particularly to shade screens of the type used in vehicles. This application is a continuation-in-part of my co-pending application Ser. No. 819,338 filed July 27, 1977.

The utilization of flexible sun screen material for mounting inside of automotive windows is becoming more prevalent and is particularly common in the sun belt states. The use of such sun shade material maintains the interior of the automobile substantially cooler than would otherwise be the case; further, the screen provides an element of privacy in that it effectively prevents one from seeing into the automobile while only moderately interfering with the outward view of one inside the automobile.

The material with which such sun screens are made is generally a perforated plastic material having a metallic or silvered exterior surface to effectively reflect the sun's rays. Alternatively, some sun screen materials incorporate thin rolled aluminum although this material is being generally replaced by plastic. The screens are typically mounted in an extruded or rolled hollow aluminum frame somewhat similar to the aluminum frame used in window screens of dwellings. The frames provide a rigid support holding the sun screen material taut.

In those applications where such sun screens are to be mounted on relatively large fixed windows, such as rear windows, the screens become quite large. It is frequently necessary to ship the manufactured and assembled sun screens from the point of manufacture to a point of distribution and installation in customers' vehicles. As stated above, many such sun screens are quite large and bulky as a result of the size of the window to which they are to be attached; unfortunately, packing and shipping such large bulky items results in package dimensions which are outside the acceptable dimensions for normal delivery means. The above statement is particularly true if a single sun screen is being shipped to an individual consumer pursuant to a mail order.

It is therefore an object of the present invention to provide a sun shade screen of the type used in automobiles that is less bulky and more readily shipped than prior art shade screens.

It is also an object of the present invention to provide a sun shade screen of the type used in automobiles that can readily and inexpensively be folded to reduce the bulk of the screen for shipment.

It is still another object of the present invention to provide a sun shade screen of the type used in automobiles that may temporarily be folded to facilitate installation in a vehicle or removal from the vehicle for subsequently cleaning a window.

Briefly, in accordance with the embodiment chosen for illustration, a sun shade screen is formed having a hollow frame securely fastened to the screen material. The frame is formed into an appropriate shape to coincide with the shape of the window to which it is to be mounted. The frame is formed of two equal frame members to permit the frame to be "doubled over" and the screen attached thereto to be folded over onto itself. The two frame members are maintained in registration through the use of flexible inserts that extend into the hollow opposing open ends of the frame sections.

The present invention may more readily be described by reference to the accompanying drawings in which.

Figure 1:
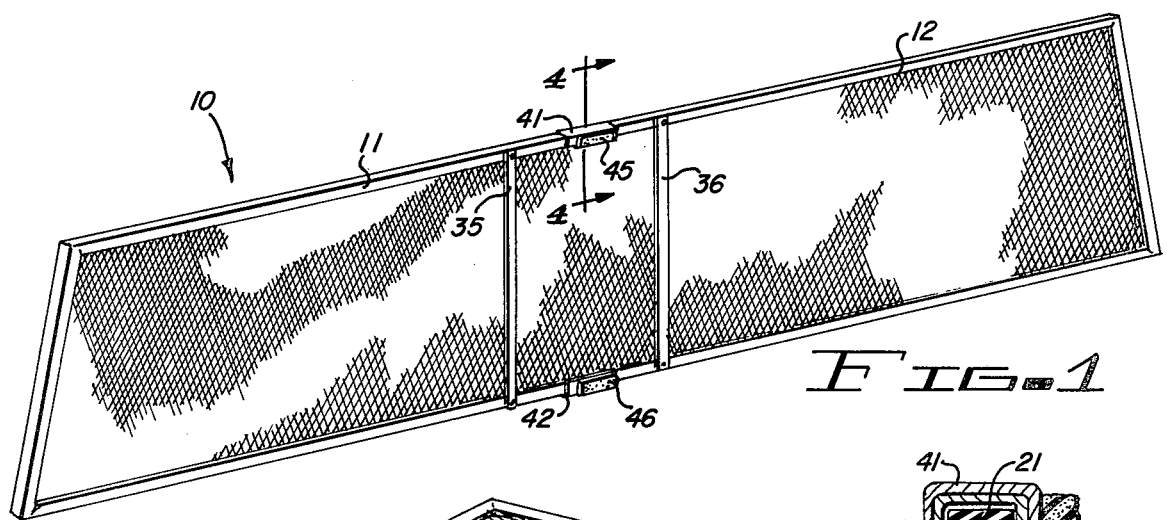
FIG. 1 is a perspective view of a sun shade screen constructed in accordance with the teachings of the present invention.

Referring now to the drawings, a hollow frame 10 is formed of extruded or rolled aluminum. The frame is shaped to accommodate the window with which it is intended to be used. In the embodiment chosen, a typical window shape found in pick-up trucks is used as illustrative. The frame 10 is formed of two members 11 and 12, that are normally held in the position shown in FIG. 1. The two members include opposing hollow frame sections 15 and 16, and 17 and 18 respectively, that are held in registration with each other by flexible inserts 21 and 22. The inserts may be formed of simple extruded or cut rubber strips having a cross-sectional shape such that the strip readily slides into the open hollow frame sections. As shown in the illustrated embodiment, the inserts are rectangular in cross-section and have a height and width slightly smaller than the inside dimensions of the hollow frame section to permit the inserts to relatively easily slide in the frames.

Figure 2:
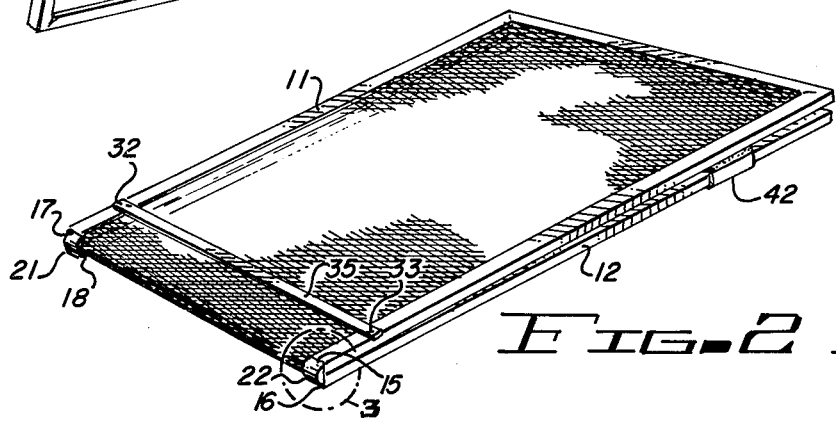
FIG. 2 is another view of the screen of FIG. 1 shown in a folded position for shipment.
Figure 4:
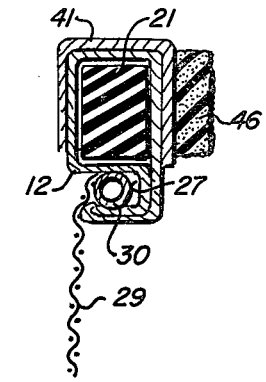
FIG. 4 is a cross-sectional view of FIG. 1 taken along line 4—4.
Figure 3:
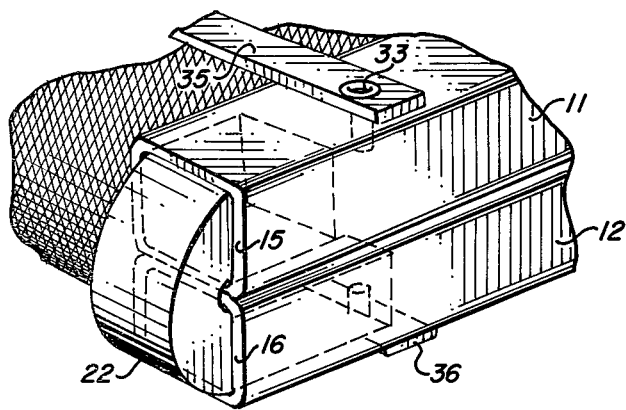
FIG. 3 is an enlarged view of a hinge of FIG. 2.
Figure 3:
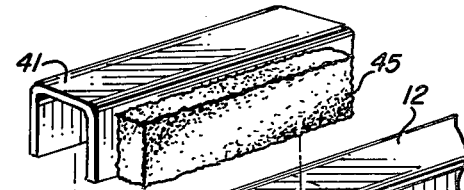
Figure 5:
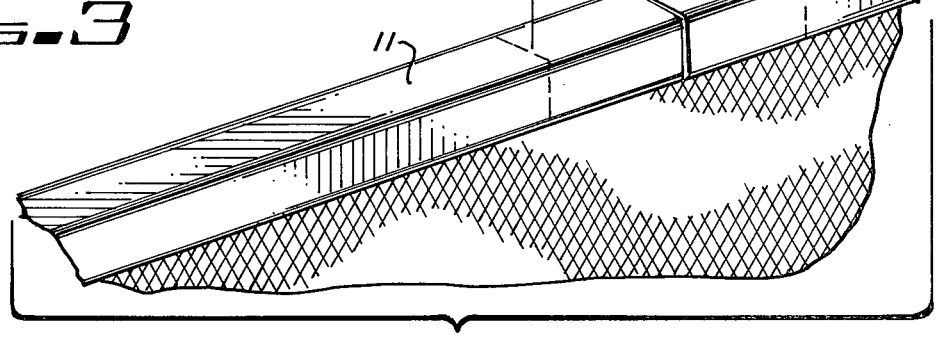
FIG. 5 is an enlarged portion of FIG. 1, partially exploded, showing the locking shoe arrangement.

As shown in FIG. 4, the frame members 11 and 12 will normally include a channel 27 for receiving an edge of the flexible shade material 29 which is secured to the frame by a grommet 30 forced into the channel 27 on top of the material 29. The flexible inserts 21 and 22 are prevented from sliding into the corresponding hollow frames more than a predetermined distance by stops formed by the extension of rivets, such as pop rivets 32 and 33, into the hollow frame. As shown in FIGS. 2 and 3, these rivets also form the means for attachment to the frame 10 of support rods 35 and 36 which are offset on either side of the middle of the frame 10 and serve to maintain the proper vertical dimension of the frame 10. The rods are not attached to the flexible screen material. When the shade screen is folded in half as shown in FIG. 2, the flexible screen material hinges or folds as shown while the inserts flex and may be pulled slightly out of contact with the rivets 32 and 33. However, the inserts are long enough to prevent being pulled out of the hollow frame sections when the screen is folded.

It may be noted that the support rods 35 and 36 may be formed of relatively thin aluminum straps (not necessarily hollow) which only minimally intrude upon the view outwardly through the screen material from inside the vehicle; further, the support rods 35 and 36 are displaced on either side of the center of the frame 10 so as not to be positioned directly in the view of a driver looking through the screen through his rearview mirror.

The frame members 11 and 12 are held in co-planar relationship with respect to one another by locking shoes 41 and 42 which may be formed of a U-shaped aluminum channel that is dimensioned to snap over the frame at the open hollow opposed frame sections. The locking shoes 41 and 42 therefore effectively maintain the screen in the shape shown in FIG. 1. Each shoe includes a strip of sponge rubber 45 and 46, respectively, which may be used in shipment as will be described hereinafter.

After manufacture, when it is desired to ship the sun shade screen of FIG. 1, the locking shoes 41 and 42 are either completely removed or slid toward one end of the frame as shown in FIG. 2. The two members 11 and 12 of the frame thus remain co-planar with opposing hollow frame sections maintained in registration by the flexible inserts 21 and 22. The frame may then be folded in half as shown in FIG. 2 by hinging the members with respect to each other causing the flexible inserts 21 and 22 to flex as shown in FIGS. 2 and 3. The flexible screen material therefore acts as a "hinge" while the rods 35 and 36 help to maintain the shape of the frame halves. The locking shoes 41 and 42, being positioned toward one end of one of the sections, provides a sponge rubber cushion to contact the opposing frame member to prevent the members from coming into contact with each other during shipment and becoming scratched or damaged. The dimensions of the folded screen permit it to be shipped and transported either by itself or with other screens in shipping containers that fall within conventional container dimensions and thus are shippable, without premium payment, in normal shipping channels.

It will be obvious to those skilled in the art that many modifications can be made without departing from the scope of the invention. For example, the cross-sectional shape of the hollow frame may vary significantly and may require a different cross-sectional shape for the flexible insert, although it is not absolutely necessary that the insert have the same cross-sectional shape as the hollow frame. In certain circumstances, assuming the proper dimensions, a circular flexible insert could be used in a rectangular hollow frame. While certain types of rubber may be suitable for use as the flexible inserts, certain types of plastics, if sufficiently resilient, may adequately perform the function.

I claim:

1. In a sun shade screen of the type having a hollow frame, and having a flexible sun screen material surrounded by and attached to said frame, the improvement comprising:

(a) a hollow frame surrounding and attached to a flexible sun screen material, said frame formed of two opposing frame members having opposing open hollow frame sections in registration with and abutting each other; and (b) said opposing open hollow frame members alligned by flexible inserts extending into opposing hollow frame sections to maintain registration of said opposing sections and to permit said frame and said flexible material to be folded upon itself.

(c) said inserts slidably positioned in, and being completely enclosed within, said abutting frame section when said frame is not folded.

2. The sun shade screen defined in claim 1 wherein said frame members are of equal size and shape.

3. The sun shade screen of claim 1 wherein said frame includes first and second support rods each extending from the top to the bottom of said frame to maintain a predetermined vertical frame dimension, said support rods positioned on either side of the middle of said frame.

4. The combination set forth in claim 3 wherein said support rods are secured to said frame by rivets which extend into said hollow frame and form stops to limit the distance said inserts can extend into said hollow frame sections.

5. The combination set forth in claim 1 including a pair of locking shoes for maintaining said opposing frame members in position with respect to each other.

6. The combination set forth in claim 5 wherein said locking shoes are formed having a U-shaped cross-section dimensioned to snugly fit over said hollow frame sections and bridge from one frame member to the next to maintain said frame members in predetermined fixed spacial relationship.

7. The combination set forth in claim 6 wherein said spacial relationship is co-planar.

* * * * *